United States Patent [19]

Hoh et al.

[11] 3,941,904

[45] Mar. 2, 1976

[54] METHOD OF APPLYING ADHESIVE COATINGS USING SEGMENTED COPOLYESTER COMPOSITIONS

[75] Inventors: George Lok Kwong Hoh; Akira Tsukamoto, both of Wilmington, Del.

[73] Assignee: E. I. Du Pont de Nemours & Company, Wilmington, Del.

[22] Filed: June 13, 1974

[21] Appl. No.: 478,970

Related U.S. Application Data

[60] Division of Ser. No. 279,370, Aug. 10, 1972, Pat. No. 3,832,314, which is a continuation-in-part of Ser. No. 151,477, June 9, 1971, abandoned, which is a continuation-in-part of Ser. No. 100,291, Dec. 21, 1970, abandoned.

[52] U.S. Cl............. 427/207; 260/19 N; 260/27 R; 260/28.5 AS; 260/33.8 UA; 260/45.75 K; 260/45.9 R; 260/75 R; 260/829; 428/346; 428/480; 428/489; 428/524; 260/33.6 UA
[51] Int. Cl.²......................................... C09J 7/02
[58] Field of Search....... 117/122 H, 122 P, 122 PF, 117/122 PA, 76 A, 68.5; 260/19 N, 27 R, 28.5 AS, 33.6 UD, 33.8 UA, 45.75 K, 45.9 R, 75 R, 829; 156/306, 332; 161/140; 427/207; 428/346, 480, 489, 524

[56] References Cited
UNITED STATES PATENTS

| | | | |
|---|---|---|---|
| 3,023,192 | 12/1972 | Shivers...................... | 260/45.75 R |
| 3,629,360 | 12/1971 | Burkhart..................... | 260/829 |
| 3,651,014 | 3/1972 | Witsiepe..................... | 260/45.9 R |

*Primary Examiner*—Bernard D. Pianalto

[57] ABSTRACT

A method of applying a coating of a hot-melt adhesive to a substrate which comprises applying as the adhesive coating a composition which comprises (A) about 1 to 99 percent by weight of thermoplastic segmented copolyester elastomer consisting essentially of a multiplicity of recurring short chain ester units and long chain ester units joined through ester linkages, said short chain ester units amounting to about 15 to 75 percent by weight of said copolyester and being derived from aromatic dicarboxylic acid such as terephthalic acid, or a mixture of terephthalic and isophthalic acids, and an organic diol such as butanediol, and said long chain ester units amounting to about 25 to 85 percent by weight of said copolyester and being derived from aromatic dicarboxylic acid such as terephthalic acid, or a mixture of terephthalic and isophthalic acids, and a long chain glycol such as polytetramethylene ether glycol, said copolyester having a melt index of less than about 150 and a melting point of at least about 125°C., and (B) about 1 to 99 percent by weight of one or more low molecular weight thermoplastic resins including hydrocarbon resins such as coumarone-indene resins, petroleum resins, styrene polymers, cyclopentadiene resins and terpene resins, bituminous asphalts, coal tar pitches, rosins, phenolic resins, chlorinated aliphatic hydrocarbon waxes, and chlorinated polynuclear aromatic hydrocarbons, can be applied to various substrates such as films, furniture, tiles, labels, tapes, decorative molding of wood or plastic, etc.

2 Claims, No Drawings

METHOD OF APPLYING ADHESIVE COATINGS USING SEGMENTED COPOLYESTER COMPOSITIONS

CROSS-REFERENCE TO RELATED APPLICATION

This application is a division of Ser. No. 279,370 filed Aug. 10, 1972, now U.S. Pat. No. 3,832,314; which is a continuation-in-part of Ser. No. 151,477, filed June 9, 1971, now abandoned; and which is a continuation-in-part of Ser. No. 100,291, filed Dec. 21, 1970, and now abandoned.

BACKGROUND OF THE INVENTION

1. Field of the Invention

This invention relates to compositions containing a thermoplastic, segmented copolyester elastomer and one or more compatible low molecular weight thermoplastic resins. These compositions are useful in a wide variety of applications including uses as hot melt adhesive compositions and coating compositions.

2. Description of the Prior Art

Hot melt adhesive compositions containing low molecular weight thermoplastic resins are not new. In recent years hot melt compositions, such as those containing ethylene/vinyl acetate copolymers, have found broad uses in applications such as adhesives for edge banding in furniture manufacture, surface laminating, shoe assembly, pressure sensitive adhesives, and paper coatings for packaging. However, the use of these hot melt compositions is limited to a narrow temperature range. For example, most ethylene/vinyl acetate copolymer-based hot melt compositions lose their strength at temperatures as low as about 80°C.

Much research has been carried out in recent years to provide hot melt compositions having improved high temperature performance. New high temperature resistant hot melt adhesives are now being introduced to the market, but these compositions either do not have the superior adhesive strength of typical ethylene/vinyl acetate copolymer-based adhesives, or they have a melt viscosity at the application temperature which is too high for much of the adhesive application equipment in use today. It would therefore be desirable to provide hot melt compositions which have an improved combination of properties with regard to good bond strength over a wide range of temperatures and low melt viscosity at application temperatures.

SUMMARY OF THE INVENTION

In accordance with this invention superior thermoplastic adhesive and coating compositions are provided which comprise, based on the total thermplastic components, (A) about 1 to 99 percent by weight of thermoplastic segmented copolyester elastomer consisting essentially of a multiplicity of recurring short chain ester units and long chain ester units joined through ester linkages, said short chain ester units amounting to about 15 to 75 percent by weight of said copolyester and being of the formula

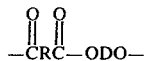

and said long chain ester units amounting to about 25 to 85 percent by weight of said copolyester and being of the formula

wherein R is the divalent aromatic radical remaining after removal of the carboxyl groups from aromatic dicarboxylic acid having a molecular weight of less than about 350, D is the divalent radical remaining after removal of the hydroxyl groups from organic diol having a molecular weight of less than about 250, and G is the divalent radical remaining after removal of the terminal hydroxyl groups from long chain glycol having an average molecular weight of about 350 to 6000, said copolyester having a melt index of less than about 150 and a melting point of at least about 125°C., and (B) about 1 to 99 percent by weight of low molecular weight thermoplastic resin which forms compatible mixtures with the segmented copolyester, is thermally stable at 150°C., and has a melt viscosity of less than about 10,000 centipoises at 200°C. These compositions are useful as hot melt, heat sealing and pressure sensitive adhesives and coatings.

DETAILED DESCRIPTION OF THE INVENTION

The thermoplastic segmented copolyester elastomers used in the compositions of this invention consist essentially of 15 to 75 percent recurring short chain ester units and 25 to 85 percent long chain ester units joined through ester linkages. The term "consisting essentially of" as used herein, is meant to include in the copolyester only those unspecified polymer units which do not materially affect the basic and essential characteristics of the copolyester as it relates to the compositions of this invention. In other words, this term excludes unspecified polymeric units in amounts which prevent the advantages of the compositions of this invention from being realized. The term "short chain ester units", as applied to units in a polymer chain, refers to the reaction products of low molecular weight diols with dicarboxylic acids to form repeat units having molecular weights of less than about 550. These units are also referred to herein as "hard segments". The term "long chain ester units", as applied to units in a polymer chain, refers to the reaction products of long chain glycols with dicarboxylic acids. These units are also referred to herein as "soft segments". Preferably the copolyester consists essentially of 15 to 65 percent hard segments and 35 to 85 percent soft segments.

The copolyesters used in accordance with this invention are prepared by polymerizing with each other (a) one or more aromatic dicarboxylic acids, (b) one or more linear long chain glycols, and (c) one or more low molecular weight diols. By the term "aromatic dicarboxylic acid" is meant a dicarboxylic acid in which each carboxyl group is attached to a carbon atom in an isolated or fused benzene ring or a ring which is itself fused to a benzene ring. The term "dicarboxylic acid", as used herein, is intended to include the equivalents of dicarboxylic acids, that is, their esters or ester-forming derivatives such as acid chlorides and anhydrides, or other derivatives which behave substantially like dicarboxylic acids in a polymerization reaction with glycol.

The aromatic dicarboxylic acid monomers useful herein have a molecular weight of less than about 350. This molecular weight requirement pertains to the acid itself and not to its ester or ester-forming derivative. Thus, the ester of a dicarboxylic acid having a molecular weight greater than 350 is included in this invention provided the acid itself has a molecular weight below about 350.

The aromatic dicarboxylic acids used in the preparation of the segmented copolyester can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), ethylene-bis-(p-benzoic acid), tetramethylene-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, indene dicarboxylic acid, and the like, as well as ring substituted derivatives thereof such as $C_1$–$C_{10}$ alkyl, halo, alkoxy or aryl derivatives. Hydroxy acids such as p($\beta$-hydroxyethoxy) benzoic acid can also be used providing an aromatic dicarboxylic acid is also present.

The preferred aromatic dicarboxylic acids for preparation of the segmented copolyester are the aromatic acids of 8 to 16 carbon atoms, particularly phenylene dicarboxylic acids such as phthalic, terephthalic and isophthalic acids. The most preferred acids are terephthalic acid and mixtures of terephthalic and isophthalic acids.

The low molecular weight diols used in the preparation of the hard segments of the copolyesters have molecular weights of less than about 250. The term "low molecular weight diol", as used herein, should be construed to include equivalent ester-forming derivatives. In this case, however, the molecular weight requirement pertains to the diol only and not to its derivatives.

Suitable low molecular weight diols which react to form the short chain ester units of the copolyesters include acyclic, alicyclic and aromatic dihydroxy compounds. The preferred diols are those with 2 to 15 carbon atoms such as ethylene, propylene, tetramethylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, and the like. Especially preferred are the aliphatic diols of 2 to 8 carbon atoms. Suitable bis-phenols include bis(p-hydroxy) diphenyl, bis(p-hydroxyphenyl) methane, bis(p-hydroxyphenyl) ethane, bis(p-hydroxyphenyl) propane and 2,2-bis(p-hydroxyphenyl) propane. Equivalent ester-forming derivatives of diols are also useful. For example, ethylene oxide or ethylene carbonate can be used in place of ethylene glycol.

The long chain glycols used to prepared the soft segments of these copolyesters have molecular weights of about 350 to 6000, and preferably about 600 to 3000. Preferably the long chain glycols have melting points of less than about 55°C., and carbon atom to oxygen atom ratios which are greater than about 2.5, that is, greater than about 2.5:1. Long chain glycols having carbon to oxygene ratios greater than about 2.5 generally have less swell in water and greater resistance to hydrolysis.

The chemical structure of the long chain polymeric part of the long chain glycol is not critical. Any substituent groups which do not interfere with the polymerization reaction to form the copolyester can be present. Thus, the chain can be a single divalent acyclic, alicyclic, or aromatic hydrocarbon group, poly(alkylene oxide) group, polyester group, a combination thereof, or the like. Any of these groups can contain substituents which do not interfere to any substantial extent with the polymerization to form the copolyester used in accordance with this invention. The hydroxy functional groups of the long chain glycols used to prepare the copolyesters should be terminal groups to the extent possible.

Suitable long chain glycols which can be used in preparing the soft segments of the copolymers include poly(alkylene ether) glycols in which the alkylene groups is of 2 to 9 carbon atoms such as poly(ethylene ether) glycols, poly(1,2- and 1,3-propylene ether) glycol, poly(1,2-butylene ether) glycol, poly(tetramethylene ether) glycol, poly(pentamethylene ether) glycol, poly(hexamethylene ether) glycol, poly(heptamethylene ether) glycol, poly(octamethylene ether) glycol, poly(nonamethylene ether) glycol, and random or block copolymers thereof, for example, glycols derived from ethylene oxide and 1,2-propylene oxide.

Glycol esters of poly(alkylene oxide) dicarboxylic acids can also be used as the long chain glycol. These glycols may be added to the polymerization reaction or may be formed in situ by the reaction of a dicarboxymethyl acid of poly (alkylene oxide) such as $HOOCCH_2(OCH_2CH_2CH_2CH_2)_xOCH_2COOH$ with the low molecular weight diol, which is always present in a stoichiometric excess. The resulting poly(alkylene oxide) ester glycol then polymerizes to form G units having the structure

in which each diol cap (D) may be the same or different depending on whether more than one diol is used. These dicarboxylic acids may also react in situ with the long chain glycol, in which case a material is obtained having a formula the same as above except that the D's are replaced with G's, the polymeric residue of the long chain glycol. The extent to which this reaction occurs is quite small, however, since the low molecular weight diol is present in considerable excess.

Polyester glycols can also be used as the long chain glycol. In using polyester glycols, care must generally be exercised to control the tendency to interchange during melt polymerization. Certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene, 1,4-cyclohexanedicarboxylate) can be utilized under normal reaction conditions, and other more reactive polyester glycols can be used if proper reaction conditions, including a short residence time, are employed.

Suitable long chain glycols also include polyformals prepared by reacting formaldehyde with glycols such as pentamethylene glycol or mixtures of glycols such as a mixture of tetramethylene and pentamethylene glycols. Polythioether glycols also provide useful products. Polybutadiene and polyisoprene glycols, copolymers of these, and saturated hydrogenation products of these materials are also satisfactory long chain polymeric glycols. In addition, the glycol esters of dicarboxylic acids formed by oxidation of polyisobutylene-diene copolymers are useful raw materials. The preferred long chain glycols are poly(alkylene ether) glycols and glycol esters of poly(alkylene oxide) dicarboxylic acids.

The relative molecular weight of the segmented copolyester is expressed herein in terms of melt index, which is an empirical measurement of inverse melt viscosity. The segmented copolyester should have a melt index of less than about 150 in order to provide useful compositions. The melt indices specified herein are determined by the American Society for Testing and Materials (herein abbreviated "ASTM") test method D 1238-65T using Condition L at 230°C. with a 2160 gram load.

It is required that the segmented copolyester have a melting point of at least about 125°C. in order to provide useful compositions. Preferably the segmented copolyester has a melting point of at least about 140°C. The high melting segmented copolyesters used herein maintain their high melting characteristics when blended with low molecular weight thermoplastic resins in accordance with this invention.

The required high melting point of the segmented copolyester is obtained by providing the polyester with crystallizable short chain ester segments. Crystallinity in the short chain ester segments is increased by the use of more linear and symmetrical aromatic diacid. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other. For example, repeating ester units such as tetramethylene terephthalate give an especially high melting short chain ester segment. On the other hand, when a non-linear and unsymmetrical aromatic diacid, such as isophthalic acid, is added to crystallizable short chain ester segments, their melting point is depressed. Small amounts of isophthalic acid are, however, very useful for controlling the melting point and improving the compatibility of segmented copolyesters with low molecular weight thermoplastic resins. Aliphatic dibasic acids should be avoided since they give low melting or non-crystalline short chain ester segments without any significant beneficial effects.

The melting points specified herein are determined by differential thermal analysis. The melting point is read from the position of the endotherm peak in a thermogram when the sample is heated from room temperature at the rate of 10°C./min. The details of this method are described in many publications, for example, by C. B. Murphy in *Differential Thermal Analysis*, R. C. Mackenzie, Editor, Volume I, Pages 643 to 671, Academic Press, New York, 1970.

The preferred segmented copolyester elastomers are those in which the aromatic dicarboxylic acid is of 8 to 16 carbon atoms, the low molecular weight diol is aliphatic diol of 2 to 8 carbon atoms, the long chain glycol is poly(alkylene ether) glycol in which the alkylene group is of 2 to 9 carbon atoms, the short chain ester units amount to about 30 to 65 percent by weight of the copolyester, the long chain ester units amount to about 35 to 70 percent by weight of the copolyester, and the copolyester has a melt index of less than about 50 and a melting point of at least about 140°C.

The copolyester elastomers prepared from terephthalic acid, or a mixture of terephthalic and isophthalic acids, 1,4-butanediol and polytetramethylene ether glycol having a molecular weight of about 600 to 3000 are particularly preferred in the compositions of this invention. The raw materials are readily available, and the adhesive and coating properties of compositions obtained from such polymers are outstanding.

A novel class of segmented copolyester elastomers described herein are those consisting essentially of a multiplicity of recurring short chain ester units and long chain ester units joined through ester linkages, said short chain ester units amounting to 15 to less than 30 percent by weight of said copolyester and being of the formula

and said long chain ester units amounting to more than 70 to 85 percent by weight of said copolyester and being of the formula

wherein R is the divalent aromatic radical remaining after removal of the carboxyl groups from aromatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000; said copolyester having a melt index of less than 150, provided that when a polymer in the fiber-forming molecular weight range formed solely from the total short chain ester units has a melting point above 200°C., said short chain ester units amount to less than 25 percent by weight of said segmented copolyester elastomer.

The copolyester elastomers used in the compositions of this invention can be made by conventional condensation polymerization procedures, as for example, in bulk or in a solvent medium which dissolves one or more of the monomers. They are conveniently prepared by a conventional ester interchange reaction. A preferred procedure involves heating the dimethyl ester of terephthalic acid, or a mixture of terephthalic and isophthalic acids, with a long chain glycol and an excess of a short chain diol in the presence of a catalyst at 150 to 260°C., followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester used in the compositions of this invention.

These prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate diacids, anhydrides or acid chlorides, for example, with diols or by other processes such as reaction of the diacids with cyclic ethers or carbonates. Obviously the prepolymer can also be prepared by carrying out these processes in the presence of the long chain glycol.

The resulting prepolymer is then converted to the high molecular weight segmented copolyester elastomer by distillation of the excess of short chain diol. Best results are usually obtained if this final distillation is carried out at less than 1 mm. pressure and 240°–260°C. for less than 2 hours in the presence of an antioxidant such as sym-di-beta-naphthyl-p-phenylenediamine or 1,3,5-trimethyl-2,4,6-tris [3,5-ditertiary-butyl-4-hydroxybenzyl] benzene.

Most practical polymerization techniques rely upon ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by batch and continuous methods. The preferred method for continuous polymerization, namely, ester interchange with a prepolymer, is a well established commercial process.

In addition to the segmented copolyester, the compositions of this invention also contain one or more low molecular weight thermoplastic resins which form compatible mixtures with the segmented copolyester, are thermally stable at about 150°C., and have melt viscosities of less than about 10,000 centipoises at 200°C. The term "thermoplastic resin", as used throughout the specification and claims, is intended to include heat softenable resins, both natural and synthetic, as well as waxy types of materials. By the term "compatible" it is meant that there is no separation into distinct layers between the segmented copolyester and the low molecular weight resin or resins at the copolyester melt temperature. In some cases this compatibility is achieved in multi-component blends even though one of the low molecular weight thermoplastic resin components may not be compatible with the segmented copolyester elastomer alone. By the phrase "thermally stable", it is meant that there is no significant permanent alteration in the properties of the resin after heating at the specified temperature for one hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, phenolic resins, chlorinated aliphatic hydrocarbon waxes, chlorinated polynuclear aromatic hydrocarbons, and the like.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology", Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl sytrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkyl-aromatic resins" fall into this classification.

The term "styrene polymers" refers to low molecular weight homopolymers of styrene as well as copolymers containing sytrene and other comonomers such as alpha-methyl-styrene, vinyl toluene, butadiene, and the like when prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk- Othmer Encyclopedia, supra, Volume 11, Pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances", 6th Edition, Volume 1, Chapter 2, Van Nostrand Co., Inc., particularly Table III on Page 60.

The term "coal tar pitches" refers to the residues obtained by the partial evaporation or distillation of coal tar obtained by removal of gaseous components from bituminous coal. Such pitches include gas-works coal tar pitch, coke-oven coal tar pitch, blast-furnace coal tar pitch, producer-gas coal tar pitch, and the like. These pitches are fully described in Abraham's "Asphalts and Allied Substances", supra, particularly Table III on Page 61.

The term "rosins" refers to the resinous materials that occur naturally in the oleoresin of pine trees, as well as derivatives thereof including rosin esters, modified rosins such as fractionated, hydrogenated, dehydrogenated and polymerized rosins, modified rosin esters, and the like. These materials are fully described in the Kirk-Othmer Encyclopedia, supra, volume 17, Pages 475 to 505.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The term "chlorinated aliphatic hydrocarbon waxes" refers to those waxes which are commonly called "chlorinated waxes" such as chlorinated paraffin waxes. These waxes typically contain about 30–70 percent by weight of chlorine.

The term "chlorinated polynuclear aromatic hydrocarbons" refers to chlorinated aromatic hydrocarbons containing two or more aromatic rings such as chlorinated biphenyls, terphenyls, and the like, and mixtures thereof. These materials typically contain 30 to 70 percent by weight of chlorine.

The compositions of this invention contain about 1 to 99 percent by weight of thermoplastic segmented copolyester elastomer and about 1 to 99 percent by weight of low molecular weight thermoplastic resin. Preferably, the composition contains about 5 to 95 percent by weight of thermoplastic segmented copolyester elastomer and about 5 to 95 percent by weight of low molecular weight thermoplastic resin.

Typically the compositions of this invention contain more than one low molecular weight thermoplastic resin. For example, low molecular weight styrene polymers have been found to lower the melt viscosity of these compositions without substantially lowering the softening point. Since low melt viscosity contributes improved wetting by the composition of the surface of the substrate, which results in better adhesion, many useful compositions will contain some styrene polymer. Styrene polymers are also useful for increasing the compatibility of other resins with the segmented copolyester elastomer. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion.

A particularly preferred composition contains segmented copolyester elastomer, styrene polymer, and one or more additional low molecular weight thermoplastic resin. The additional low molecular weight thermoplastic resins also have the effect of lowering the cost of the composition.

It is sometimes desirable to stabilize the compositions of this invention against heat or radiation by ultra-violet light. This can be done by incorporating stabilizers or antioxidants in these compositions. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state.

Representative phenol derivatives useful as stabilizers include hydroquinone, 2,6-ditertiary-butyl-p-cresol, tetrakis[methylene-3-(3',5'-ditertiary-butyl-4'-hydroxyphenyl) propionate] methane, 4,4'-bis(2,6-ditertiarybutylphenol), 1,3,5-trimethyl-2,4,6-tris[3,5-ditertiary-butyl-4-hydroxybenzyl] benzene, and 4,4'-butylidene-bis(6-tertiary-butyl-m-cresol). Various inorganic metal salts or hydroxides can be used as well as organic complexes such as nickel dibutyl dithiocarbamate, manganous salicylate, and copper 3-phenyl-salicylate. Typical amine stabilizers include aromatic amines such as N,N'-bis(beta-naphthyl)-p-phenylenediamine, N,N'-bis(1-methylheptyl)-p-phenylene diamine, and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of the compositions of this invention can be modified by the incorporation of various conventional inorganic fillers such as wood flour, silicates, silica gel, alumina, clays, chopped fiberglass, titanium dioxide, carbon black, and the like. In general, fillers have the effect of increasing the melt viscosity and the modulus or stiffness of the composition at various elongations.

The properties of the compositions of this invention can be further modified by the incorporation of thermally stable thermoplastic polymers of ethylenically unsaturated monomers including homopolymers of vinyl esters such as vinyl acetate, copolymers of these vinyl esters with other vinyl monomers such as ethylene, vinyl chloride and the like, and polymers of alkyl acrylates and methacrylates, or thermally stable condensation polymers such as polyesters and polyamides, and the like. For example, the addition of a copolymer of ethylene and vinyl acetate often increases the tackiness of pressure sensitive adhesive compositions of this invention. These modifying polymers typically have melt viscosities above about 10,000 centipoises at 200°C. and thus are not low molecular weight thermoplastic resins as defined herein.

These compositions can also be colored by the addition of organic or inorganic pigments or organic dyes where their effect is desired. Suitable inorganic pigments include rutile and anatase dioxides, aluminum powder, cadmium sulfides and sulfo-selenides, lead antimonate, mercury cadmiums, chromates of nickel, tin and lead, ceramic greens such as chromium, cobalt, titanium and nickel oxides, ceramic blacks such as chromium, cobalt and iron oxides, carbon black, ultramarine blue, and the like. Suitable organic pigments include phthalocyanine blues and greens, quinacridones, and the like. Suitable dyes include disperse dyes such as Colour Index Disperse Blues 59, 63 and 64. Optical brightnesss such as "Uvitex" CF, sold by Ciba Corp., and "Tinopal" AN, sold by Geigy Chemical Corp., may also be incorporated where their effect is desired.

Plasticizers including phthalate esters such as dioctyl phthalate, and aryl phosphates such as tricresyl phosphate, and the like, may be added for applications where their effect is desired. Flame retardant additives, such as zinc borate, antimony trioxide, tris(2,3-dichloropropyl) phosphate, tris(2,3-dibromopropyl) phosphate, chlorinated waxes, and the like may be added, if desired. Other minor additives such as surfactants or lubricants may also be added.

One of the important advantages of the thermoplastic compositions of this invention is that the copolyester elastomers and the low molecular weight thermoplastic resins are easy to blend together due to the relatively low melt viscosity of these compositions at elevated temperatures as compared to compositions of the prior art having comparable bond strength. The component of the compositions of the invention can be blended by variously well known procedures such as, for example, blending in molten form, blending in a solvent, or mixing aqueous dispersions of the components. Blending in the melt may be carried out by first melting the segmented copolyester elastomer and then adding low molecular weight thermoplastic resin to the melt, by first melting the low molecular weight thermoplastic resin and then adding segmented copolyester elastomer to the melt, or by first blending the segmented copolyester elastomer and the low molecular weight thermoplastic resin together in finely divided form and then melting the blend, for example, on a hot roller mill or by simultaneously feeding the components to an extruder.

In addition to these blending procedures, it is also possible to take the copolyester from the synthesis step and, while it is still molten, blend solid, premelted, or liquid low molecular weight thermoplastic resin with it. Other ingredients such as antioxidants, fillers, plasticizers, and the like can also be added at this time. This blending process can be carried out with an in-line mixer or with a separate mixing vessel, and has the advantage that it does not require isolation of the copolyester.

The thermoplastic compositions of this invention can also be blended by dissolving the segmented copolyester and the low molecular weight thermoplastic resin in a solvent. Suitable solvents for preparing these solutions include chlorinated hydrocarbons such as methylene chloride, chloroform, trichloroethylene, solvent mixtures such as mixtures of trichloroethylene and isopropanol, and the like.

Aqueous dispersions of the thermoplastic compositions of this invention can be prepared by dissolving the segmented copolyester and the low molecular weight thermoplastic resin together in a suitable water-immiscible organic solvent, emulsifying the organic solvent containing the segmented copolyester and the low molecular weight thermoplastic resin in water, and removing the organic solvent as described by Funck and Wolff in U.S. Pat. No. 3,296,172. Dispersions can also be prepared by dissolving the segmented copolyester in a suitable water-immiscible organic solvent, dissolving the low molecular weight thermoplastic resin in a different water-immiscible organic solvent, emulsifying each organic solvent solution in water, removing the organic solvent from each emulsion, thereby forming separate dispersions, and mixing the dispersions together in proper amounts.

The compositions of this invention are useful as adhesives and as coating compositions. These compositions can be applied in the form of a dry blend, a solution, an aqueous dispersion, or in molten form. The method of application does not appreciably affect the performance of the composition.

Conventional application equipment can be used for applying the compositions of this invention in the various forms. For application of solutions or dispersions, as in the case of heat sealing and pressure sensitive adhesives, various known application techniques can be used including brushing, dipping, roll coating, wire-wound rod application, doctoring, printing, and the like. Spraying or curtain coating techniques are also applicable to these forms of the compositions.

For application of these compositions in the melt form, dipping, roll coating, calendaring, curtain coating, extruding, hot spraying, and other hot melt application techniques can be used. Powder coatings of appropriate nontacky compositions can also be applied by known fluidized bed techniques, electrostatic powder spray application, or plasma spraying.

In using the compositions of this invention as hot melt adhesives, the joining step can be accomplished by applying the molten composition to one surface, bringing the other surface into contact with the molten composition, and allowing the bond to cool. Coatings of these compositions can be bonded to other surfaces or themselves by heat or solvent activation of the coating, and contacting the activated coating with the second surface and allowing the bond to cool or the solvent to evaporate. Heat activation of the coating is typically carried out in an oven or using an infrared lamp. Simultaneous application of heat and pressure, or heat sealing, can be used with these compositions to accomplish bonding. High frequency dielectric and ultrasonic waves can also be used to activate these compositions to effect bonding.

The compositions of this invention are characterized by an outstanding combination of properties. These compositions have demonstrated excellent adhesion to many substrates including difficultly adherable substrates such as polypropylene. The compositions containing up to 50 percent by weight of segmented copolyester typically have 180° peel strengths higher than about 0.2 pounds per linear inch with a variety of substrates. They have high temperature bond strengths, for example, as shown by failure temperatures higher than about 70°C. in the WPS-68 test. They have good low temperature flexibility, that is, resistance to breakage on impact, and a minimum elongation of 50 percent at room temperature. They have sufficient thermal stability to render them suitable for hot melt application with good pot life. Heating to 150° to 200°C. does not appreciably alter the properties of the composition. They also have tensile strengths higher than 200 psi. at room temperature.

The compositions containing up to 50 percent by weight of segmented copolyester elastomer are particularly useful as hot melt adhesives in a wide variety of adhesive use applications such as edge banding and surface lamination, for example, in furniture manufacture, vinyl lamination, sole attachment and box-toe construction in shoe assembly, and as pressure sensitive adhesives for carpet tiles, vinyl tiles, premium labels, tapes, decals, decorative molding of wood or plastic, and the like.

Compositions containing about 50 percent or more by weight of thermoplastic segmented copolyester elastomer are particularly useful in the preparation of molded, extruded, and dipped goods, coatings, binders, extruded adhesives, sealants, and the like. Films can be prepared from these compositions by molding, extrusion and calendering techniques. These compositions typically contain about 50 to 99 percent by weight of segmented copolyester elastomer and about 1 to 50 percent by weight of low molecular weight thermoplastic resin. Preferably they contain about 50 to 95 percent by weight of segmented copolyester elastomer and about 5 to 50 percent by weight of low molecular weight thermoplastic resin.

Compositions containing these higher concentrations of segmented copolyester elastomer can also be used as concentrates for further compounding with the same or other low molecular weight thermoplastic resins and modifiers, as well as being useful as such. Such concentrated compositions have the advantage of being processable with additional components at lower temperatures and shear requirements than the segmented copolyester elastomer itself. For example, a mixture containing an equal weight of segmented copolyester elastomer and low molecular weight, thermoplastic styrene homopolymer is typically blended at a minimum temperature of about 170°C. However, additional low molecular weight thermoplastic resins can be mixed with this concentrate at a minimum blending temperature of about 140°C. Moreover, additional low molecular weight thermoplastic resins which have limited compatibility with the segmented copolyester elastomer alone tend to be more compatible with such concentrates.

The addition of small amounts of lower melting thermoplastic resins to thermorplastic segmented copolyester compositions improves the adhesion of these compositions to reinforcement components in the manufacture of rubber articles such as fabric reinforced flexible belting and hose, and coated fabrics. For example, blends containing 90 percent thermoplastic segmented copolyester with 5 percent polystyrene resin and 5 percent coumarone-indene resin have very desirable wetting characteristics with good penetration into woven and non-woven fabrics resulting in high mechanical adhesion. In many cases, these effectss can be achieved at relatively low application temperatures thereby protecting the fabric components from extensive heat damage. These compositions are also useful as binders in thread and cord manufacture.

The compositions of this invention are particularly useful in the manufacture of reinforced flexible hose. Hoses are conventionally prepared by placing a braid, spiral, wrapped ply, loom or knit reinforcement layer over a suitable polymeric inner tube. The reinforcement layer may be made of cotton, synthetic yarn or wire. Adhesion of the reinforcement layer is usually obtained by impregnating the reinforcement layer with a binder, that is, a thin layer of gum, called friction, or a dough or cement composition. An outer cover layer of a suitable polymeric material is then applied. Binder layers are generally applied from a solvent-containing coating composition followed by a drying step to remove the solvent. Cover layers are generally applied by cross-head extrusion.

Use of the compositions of this invention in the manufacture of reinforced flexible hose has led to the development of new and improved manufacturing techniques. Because of their improved rheological properties, particularly their low melt viscosity, the compositions of this invention, when used as a cover layer, give improved processing behavior in conventional cross-head extrusion operations. The unique wetting properties of these compositions allow improved penetration into and adhesion to the reinforcement layer.

Moreover, these compositions can be used as a solvent-free hot melt bindner for the reinforcement layer, thereby eliminating the drying step to drive off solvent. The hot melt binder may be applied in the reinforcement layer usisng hot melt techniques such as drawing the inner tube with an unimpregnated reinforcement layer through a funnel applicator.

Furthermore, the unique rheological, wetting and adhesive properties of the compositions of this invention allow one to apply a cover layer of these compositions to the unimpregnated reinforcement layer without any adverse effect from the absence of the binder. These compositions can be applied by hot melt techniques such as by drawing the inner tube with an unimpregnated reinforcement layer through a funnel applicator having an exit orifice corresponding to the desired outside diameter of the finished hose. When applying these compositions in this novel manner, process simplification and reduced equipment investment are achieved as compared with a conventional two-step process involving solution coating with a binder followed by cross-head extrusion of the cover layer.

When the compositions of this invention are used in the manufacture of reinforced flexible hose, the composition may vary over the range of about 1 to 99 percent by weight of segmented copolyester and about 1 to 99 percent by weight of low molecular weight thermoplastic resin. Compositions which are applied in a separate step in the binder layer preferably contain about 5 to 50 percent by weight of segmented copolyester and about 50 to 95 percent by weight of low molecular weight thermoplastic resin. When the composition is used as the cover layer, or as the binder and cover layers in a single step, it preferably contains about 50 to 95 percent by weight of segmented copolyester and about 5 to 50 percent by weight of low molecular weight thermoplastic resin.

EXAMPLES OF THE INVENTION

The following examples, illustrating the novel adhesive and coating compositions of this invention, are given without any intention that the invention be limited thereto. All parts and percentages are by weight.

In the examples, ring and ball softening points of the blends were determined by ASTM test method E28-67. Tensile properties were determined with compression molded samples using ASTM test method D1708-66.

The peel strengths of the segmented copolyester-based adhesives of this invention were determined in the examples by a 180° peel test using a plastic film laminated to a particle board in accordance with ASTM test method D903-49.

High temperature bond failure temperatures were determined by test method WPS-68 described by W. Schneider and D. Fabricius in the German periodical "Adhaesion", January, 1969, Pages 28–37. This test measures the temperature at which the bond between a particle board and wood veneer or plastic band fails under a constant shear stress of 100 g./cm$^2$. when the environmental temperature is raised by a 5°C. increment every hour.

EXAMPLE 1

In a 500 ml. resin kettle were placed 195 g. of "Piccolastic" A 50, a low molecular weight styrene homopolymer having a softening point of 50°C. and a melt viscosity of 29 centipoises at 190°C. sold by Pennsylvania Industrial Chemical Corp., and 1.5 g. of "Irganox" 1010, a tetrakis-[methylene-3-(3',5'-di-t-butyl-4'-hydroxyphenyl) propionate] methane high melting phenolic antioxidant sold by Geigy Chemical Co., and the contents were heated to 175°C. in an oil bath. To the molten mixture was added 120 g. of a segmented copolyester derived 35.4% from terephthalic acid, 13.4% from butanediol and 51.2% from poly(tetramethylene ether) glycol (abbreviated PTMEG hereafter) having a molecular weight of about 1000, containing 42.6 percent short chain ester units and having a melting point of 170°C. measured by differential thermal analysis and a melt index of 47.7, while stirring at 175°C. The mixing was continued for 2 hours at 175°C. under a continuous slow stream of nitrogen to give a transparent mixture which on cooling to room temperature became an opaque, slightly tacky, rubbery material. The blend had a melt viscosity of 8400 cps. at 190°C., showed strong adhesion to various plastic substrates, had a ring and ball softening point of 154°C., a high temperature bond failure temperature of 130°–135°C., a tensile strength of 800 psi., and an elongation of 1100%.

EXAMPLE 2

On a roller mill heated to 185°C. was placed 12 g. of a segmented copolyester derived 28.6% from terephthalic acid, 9.3% from butanediol and 62.1% from PTMEG having a molecular weight of about 1000, containing b 29.8% short chain ester units, and having a melting point of 149°C. and a melt index of 18. To the molten copolyester were added 28 g. of "Foral" 105, a pentaerythritol ester of a stabilized rosin having a ring and ball softening point of 105°C. sold by Hercules, Inc., and 0.4 g. of "Irganox" 1010 antioxidant (Example 1). After about 10 minutes of milling at 185°C., a homogeneous mixture was obtained. This blend was used as an adhesive between a particle board and a strip of "Formica", a high pressure melamine/formaldehyde laminate. The adhesive had a high temperature bond failure temperature of 110°–115°C.

EXAMPLE 3

In the same manner as in Example 2, 24 g. of "Foral" 105 rosin ester (Example 2 ), 16 g. of a segmented copolyester derived 29.2% from terephthalic acid, 12.2% from butanediol, and 58.6% from PTMEG having a molecular weight of about 2100, containing 38.0% short chain ester units, and having a melting point of 188°C. and a melt index of 89, and 0.4 g. of "Irganox" 1010 antioxidant Example 1) were blended. The composition had a high temperature bond failure temperature above 150°C.

EXAMPLE 4 to a ½ gallon sigma-blade mixer heated by high pressure steam to 170°C. were charged 0.6 lb. of "Piccoumaron" 410 HL, a polyindene type, highly aromatic, thermoplastic petroleum resin having ring and ball softening point of about 110°C. and a melt viscosity of 158 centipoises at 190°C. sold by Pennsylvania Industrial Chemical Corp., 0.6 lb. of "Piccolastic" A 5, a low molecular weight styrene homopolymer having ring and ball softening point of about 5°C. and a melt viscosity of 18 centipoises at 190°C. sold by Pennsylvania Industrial Chemical Corp., and 0.01 lb. of "Irganox" 1010 antioxidant (Example 1). to the above molten mixture was added 0.8 lb. of a segmented copolyester derived 31.6% from terephthalic acid, 9.2% from isophthalic acid, 16.6% from butanediol, and 42.6% from PTMEG having a molecular weight of about 1000, containing 52.6% short chain ester units, and having a melting point of 158°C. and a melt index of 15. The mixing was continued for 1 hour and 45 minutes at 170°C. after which the mixture was homogeneous. The blend had a melt viscosity of 30,000 cps. at 190°C., and the high temperature bond failure temperature of a "Formica"/particle board bond was 130°–135°C. The 180° peel strengths were 20 pounds per linear inch (pli.) to "Decatone", a plasticized polyvinyl chloride film back-printed with a wood grain pattern sold by Litton Industries, 30 pli. to plain polyvinyl chloride film, and 20 pli. to Mylar, a polyethylene terephthalate polyester film sold by E. I. du Pont de Nemours and Co., Inc. These values compare favorably with commercially available adhesives which typically give less than about 5 pli. peel strength. The blend showed a tensile strength of 1,100 psi. and an elongation of 1,200%.

"Formica" laminate strips were bonded to edges of particle boards with the above adhesive composition using a Raimann Edge Bander, an automatic edge banding machine, at a machine speed of 55–60 feet/min. and an adhesive temperature of about 200°C. The edge-banded particle board developed no defects during an accelerated high temperature test at 82°C. for 19 hours.

Similarly, walnut veneer strips were edge-banded to particle boards. Oil stain and a lacquer finish were applied, followed by high temperature drying, all of which had no adverse effect on the tight bond obtained.

EXAMPLE 5

In the same manner as Example 1, 93 g. of "Piccolastic" A 5 styrene homopolymer (Example 4), 90 g. of "Piccoumaron" 410 HL polyindene petroleum resin (Example 4), 1.5 g. of "Irganox" 1010 antioxidant (Example 1), and 120 g. of a segmented copolyester were blended, except that the oil bath temperature was 210°C. The copolyester was derived 44.4% from terephthalic acid, 18.8% from butanediol, and 36.8% from PTMEG having a molecular weight of 1000, contained 59.3% short chain ester units, and had a melting point of 203°C. and a melt index of 8. The ring and ball softening point of the blend was above 180°C. The blend adhered strongly to "Formica" when applied in molten form at 200°C.

EXAMPLE 6

In the same manner as in Example 2, a well mixed blend was prepared from 20 g. of segmented copolyester derived 31.1% from terephthalic acid, 16.7% from isophthalic acid, 21.0% from butanediol, and 31.2% from PTMEG having a molecular weight of about 1,000, containing 65.6% short chain ester units, and having a melting point of 137°C. and a melt index of 7, 22.5 g. of "Piccoumaron" 410 HL polyindene petroleum resin (Example 4), 7.5 g. of "Piccolastic" A 5 styrene homopolymer (Example 4), and 0.25 g. of "Irganox" 1010 antioxidant (Example 1). The blend had a tensile strength of 2300 psi. and an elongation of 810%. When a "Formica" strip was bonded to a particle board using this composition as a hot melt adhesive, a strong and tight joint was obtained. The high temperature bond failure temperature was 130°–135°C.

EXAMPLE 7

The segmented copolyester used in Example 4 was mixed in the ratio of 4:6 with "Piccoumaron" 10, a polyindene type, highly aromatic, thermoplastic petroleum resin having a ring and ball softening point of 10°C. and a melt viscosity of 40 centipoises at 190°C. sold by Pennsylvania Industrial Chemical Corp. The blend had the melt viscosity of 27,000 cps. at 190°c., and a high temperature bond failure temperature of 135°–140°C. in a "Formica"/particle board bond.

EXAMPLE 8 the segmented copolyester used in Example 4 and "Neville" R-27, a coumarone-indene resin having a ring and ball softening point of 5°–15°C. sold by Neville Chemical Co., were blended in a ratio of 3:7 in the sane manner as in Example 1. The resulting product showed good adhesive performance to many substrates. An equally good adhesive was obtained by replacing "Neville" R-27 with "Nevillac" 10°, a phenol-modified coumarone-indene resin having a ring and ball softening point of 5°–15°C. sold by Neville Chemical Co. Performance of these blends are summarized in Table I.

TABLE I

| Modifying Resin | Softening Point,°C. | 180° Peel Strength,pli., to | | |
|---|---|---|---|---|
| | | "Decatone" | PVC | Mylar |
| "Neville" R-27 | 139 | 18 | 22 | 13 |
| "Nevillac" 10° | 69 | 18 | 18 | 5 |

EXAMPLE 9

The segmented copolyester used in Example 4 and "LTP" 115, a phenol-modified terpene resin having a softening point of 115°C. and a melt viscosity of 224 centipoises at 190°C. sold by Pennsylvania Industrial Chemical Corp., were blended in a ratio of 3:7 in the manner described in Example 1. A hard resinous blend was obtained. Its adhesive properties were improved by replacing 40% of the "LTP" 115 with "Piccolastic" A 5 styrene homopolymer (Example 4). The ternary blend thus obtained was tough and flexible and showed peel strengths of 17 pli. to "Decatone" film (Example 4) and 26 pli. to Mylar film (Example 4).

EXAMPLE 10

Intimate blends of the segmented copolyester used in Example 4 and "Piccolastic" A 5 styrene homopolymer (Example 4) were prepared by the procedure described in Example 1. Highly adhesive, elastomeric blends were obtained. Some properties of the blends are shown in Table II. Small amounts of the segmented copolyester markedly increase the softening point of the "Piccolastic" A 5 resin.

TABLE II

| Copolyester/ "Piccolastic" A 5 | Melt Viscosity at 190°C., cps. | R & B Softening Point, °C. | 180° Peel Strength,pli., to | | |
|---|---|---|---|---|---|
| | | | "Decatone" | PVC | Mylar |
| 0/100 | 18 | 5 | <1 | <1 | <1 |
| 10/90 | 120 | 122 | 3 | 6 | 3 |
| 20/80 | 1020 | 137 | 10 | 13 | 10 |
| 30/70 | 6800 | 141 | 9 | 3 | 10 |

EXAMPLE 11

In the same manner as in Example 2, 16 g. of the segmented copolyester of Example 4, 16 g. of "Durez" 12603, a thermoplastic, oil soluble, terpene phenolic resin having an average ring and ball softening point of 152°C. sold by Hooker Chemical Corp., 8 g. of "Piccolastic" A5 styrene homopolymer (Example 4) and 0.2 g. of "Irganox" 1010 anti-oxidant (Example 1) were thoroughly mixed. The product was a nearly transparent tough adhesive, which showed a bond failure temperature of 115° to 120°C. A product of similar properties was prepared by using "CKM" 2432, a thermoplastic, oil soluble, phenolic resin sold by Union Carbide Corp. in place of the "Durez" resin.

EXAMPLE 12

A blend consisting of 40 g. of the segmented copolyester of Example 4, 40 g. of "Piccoumaron" 410 HL polyindene petroleum resin (Example 4), 20 g. of tricresyl phosphate plasticizer and 0.5 g. of "Irganox" 1010 antioxidant (Example 1) was prepared in the same manner as in Example 1. The product was non-tacky and highly flexible and had a high temperature bond failure temperature of 120° to 125°C.

EXAMPLE 13

In the same manner as in Example 2, 16 g. of a segmented copolyester derived 31.6% from terephthalic acid, 9.2% from isophthalic acid, 16.6% from butanediol and 42.6% from "Carbowax" 1000, a poly(ethylene ether) glycol having a molecular weight of about 1000 sold by Union Carbide Corp., containing 52.5% short chain ester units, and having a melting point of 140°C. and a melt index of 24, 12 g. of "Nevindene" R-7, a coumaron-indene resin having a ring and ball softening point of 93°–120°C. sold by Neville Chemical Co., 12 g. of "Neville" R-27 coumarone-indene resin (Example 8), and 0.2 g. of "Irganox" 1010 antioxidant (Example 1) were thoroughly mixed. The resulting blend was a good adhesive, e.g., the bond strength of "Decatone" polyvinyl chloride film (Example 4) bonded to particle boards with this material was 7 to 12 lbs./in. when peeled at 180° angle at a rate of 0.2 in./min. The blend had a tensile strength of 1160 psi. and an elongation of 1200% at break.

EXAMPLE 14

In the same manner as in Example 1, 400 g. of a segmented copolyester derived 29.7% from terephthalic acid, 7.4% from isophthalic acid, 16.4% from butanediol and 46.5% from "Voranol" P-2001, an ethylene oxide capped poly(1,2-propylene ether) glycol of molecular weight of about 2000 sold by Dow Chemical Co., containing 51.0% short chain ester units, and having multiple melting points of 169°C., 183.5°C. and 191°C., and a melt index of 5.2, 20 g. of "LTP" 115 phenol-modified terpene resin (Example 9), 40 g. of "Piccoumaron" 10 polyindene petroleum resin (Example 7) and 0.5 g. of "Irganox" 1010 antioxidant (Example 1) were blended. The product was a strong adhesive which have a substrate tearing bond when "Decatone" was laminated on the surface of particle boards.

EXAMPLE 15

In the same manner as in Example 4, 20 parts of the segmented copolyester used in Example 4, 55 parts of "Piccolastic" A 5 styrene homopolymer (Example 4), 25 parts of "LTP" 115 terpene resin (Example 9), and 0.5 part of "Irganox" 1010 antioxidant (Example 1) were blended. The blend was a pressure sensitive adhesive with good peel-reseal properties.

EXAMPLE 16

By the method described in Example 2, 12 g. of the segmented copolyester used in Example 4, and 28 g. of "Aroclor" 5460, a chlorinated polyphenyl available from Monsanto Co., were blended on a hot roller mill. The homogeneous mixture obtained had a softening temperature of 116°C. and showed peel strengths of 11 pli. to "Decatone" film (Example 4), and 36 pli. to standard polyvinyl chloride film.

EXAMPLE 17

In the same manner as in Example 1, 20 parts of the segmented copolyester used in Example 4, 60 parts of "Piccolastic" A 5 styrene homopolymer (Example 4), 20 parts of Elvax 150, an ethylene/vinyl acetate copolymer containing 33% vinyl acetate sold by E. I. du Pont de Nemours and Co., Inc., and 0.5 part of "Irganox" 1010 antioxidant (Example 1) were thoroughly mixed. The blend had a ring and ball softening point of 152°C., but maintained tackiness for a few hours after the molten blend was allowed to cool at room temperature.

EXAMPLE 18

In the manner described in Example 2, 30 parts of the segmented copolyester described in Example 4, and 70 parts of "Transphalt" 50, a bituminous asphalt having ring and ball softening point of 50°C. available from Pennsylvania Industrial Chemical Corp., and 0.5 part of "Irganox" 1010 antioxidant (Example 1) were blended into an intimate mixture. The heat seal bond between "Decatone" films with this mixture gave a 180° peel strength of 11 pli.

EXAMPLES 19–24

Using a 1000 ml. resin kettle, the segmented copolyester elastomer of Example 3 was blended with various amounts of "LTP" 115 terpene resin (Example 9); "Piccolastic" A 5 styrene homopolymer (Example 4); "Piccolastic" A 25, a low molecular weight styrene homopolymer having a ring and ball softening point of about 25°C. sold by Pennsylvania Industrial Chemical Corp.; "Nevillac" hard, a phenol-modified coumarone-indene thermoplastic resin having a ring and ball softening point of 70° to 80°C. sold by Neville Chemical Co.; "Nevillac" 10° coumarone-indene resin (Example 8); and Elvax 150 ethylene-vinyl acetate copolymer (Example 13). The compositions of these blends are given in Table III.

The resin kettle was heated by an electric mantle to 175° to 180°C. with agitation until a homogeneous melt was formed. The sponge backing of commercial carpet tile was coated with the molten adhesive at 180°C. by drawing down with a No. 12 wire wound bar. Each of these compositions exhibited good pressure-sensitive adhesion.

TABLE III

| | | Wt. % Composition | | | | | |
|---|---|---|---|---|---|---|---|
| Example | Segmented Copolyester Elastomer | "LTP" 115 | "Piccolastic" A5 | "Piccolastic" A25 | "Nevillac" Hard | "Nevillac" 10° | Elvax 150 |
| 19 | 20 | 20 | 60 | — | — | — | — |
| 20 | 20 | 20 | — | 60 | — | — | — |
| 21 | 20 | — | — | 80 | — | — | — |
| 22 | 20 | — | — | 60 | 20 | — | — |
| 23 | 15 | — | — | — | 20 | 65 | — |
| 24 | 15 | 15 | 60 | — | — | — | 10 |

Example 25

Twenty-seven pounds of the segmented copolyester used in Example 4, 9 lbs. of "LTP" 115 phenol-modified terpene resin (Example 9), 9 lbs. of "Piccoumaron" 410 HL polyindene petroleum resin (Example 4), 55 lbs. of "Neville" R-27 coumarone-indene resin (Example 8), and 0.5 lb. of "Irganox" 1010 anti-oxidant (Example 1) were mixed in the same manner as in Example 1 except that a 20 gallon kettle was used and the contents were heated by steam to 180°C. The product had a melt viscosity of 14,000 centipoises at 170°C. Particle boards were coated with the blend, 3 mils thick, using an Ashdee-Steinemann curtain coater. The coated boards were then passed underneath a heater to melt the adhesive layer and then nipped with a 6-mil, plasticized poly(vinyl chloride) film. The laminate showed strong, heat resistant adhesion.

EXAMPLE 26

In the same manner as in Example 4, 0.5 lb. of the segmented copolyester of Example 4 was blended with 0.7 lb. of "Piccolastic" A 5 styrene homopolymer (Example 4), 0.8 lb. of "Piccoumaron" 410 HL polyindene petroleum resin (Example 4), and 0.01 lb. of "Irganox" 1010 antioxidant (Example 1). The blend had a melt viscosity of 11,000 cps. at 170°C. and was highly adhesive when applied molten. Kraft paper was coated with this blend in a molten state. The coated kraft paper was heat sealed with uncoated kraft paper. The bond thus formed withstood a peeling stress of 200 g./in. at 130°C. Corrugated paper board was manufactured with this adhesive using a hot melt corrugator.

EXAMPLE 27

A dispersion was prepared by dissolving a 50:50 blend of the segmented copolyester used in Example 4 and "Cellolyn" 21, a phthalate ester of technical hydroabictyl alcohol obtained from rosin and having a softening point of 60°–70°C. available from Hercules Inc., in a trichloroethylene-isopropanol mixture, followed by dispersing the solution in water with Duponol WAQE, a sodium salt of technical lauryl alcohol sulfate surface active agent sold by E. I. du Pont de Nemours and Co., Inc., and removing the organic solvents by the method described by Funck and Wolff in U.S. Pat. No. 3,296,172. The tensile properties of a film prepared from the dispersion were essentially identical to those of a film compression molded from a melt blend of the same resins.

Films were coated with the dispersion and dried, then heat-sealed at 140°C. and 40 psig. for 6 seconds. The 180° peel strength of Mylar to Mylar adhesion was 275 g. per linear inch and the adhesion was found to be very durable when the laminate was soaked in water. The 180° peel strengths of heat-sealed laminates were 150 g. per linear inch for cellophane/cellophane bonds, and 90 g. per linear inch for polypropylene/polypropylene bonds.

EXAMPLE 28

Example 27 was repeated except that each resin component was dispersed separately in one-half the specified amount of solvent mixture, water and surfactant, and the two dispersions were then mixed together. The 180° peel strengths were essentially the same as those obtained in Example 27.

EXAMPLE 29

In the same manner as in Example 1, 20 parts of the segmented copolyester used in Example 4, 58.8 parts of "Piccolastic" A 5 styrene homopolymer (Example 4), 21.2 parts of "Nevillac" Hard phenol-modified coumarone-indene resin (Examples 19–24), and 0.5 part of "Irganox" 1010 antioxidant (Example 1) were blended into a homogeneous mixture. The product had a melt viscosity of 10,000 cps. at 120°C. and a ring and ball softening point of 127°C. The molten adhesive was spread thin over a particle board surface with a spatula and the printed side of a "Decatone" sheet was adhered to it and pressed uniformly. The laminate was exposed for 14 days to 60°C. without any change in appearance.

EXAMPLE 30

Ten grams of the segmented copolyester of Example 4 and 10 g. of "Cellolyn" 21 rosin ester (Example 27) were dissolved in 200 ml. of chloroform with agitation and warming. The clear yellow solution thus obtained was used to mend a torn seam in an inflatable polyvinyl chloride plastic toy. The bond had good strength and durability.

EXAMPLE 31

"Neolite", a rubber composition shoe soling material ⅛ inch thick with a specific gravity of 1.23 and a Shore A surface hardness of 93–96 sold by Goodyear Tire and Rubber Co., and a polyvinyl chloride/vinyl acetate shoe upper material were prepared for bonding by sanding the surfaces with 80 grit closed-coat aluminum oxide paper. Strips, 8 inch × 8 inch, of these substrates were coated with a molten adhesive at 177°C. in a 10-mil. thick application using a No. 12 wire wound bar. The adhesive used in this example was prepared in the same manner as in Example 4 from 25 parts of the segmented copolyester of Example 4, 50 parts of "Piccolastic" A 50 styrene homopolymer (Example 1), 25 parts of "LTP" 115 terpene resin (Example 9), and 0.5 part of "Irganox" 1010 antioxidant (Example 1). The adhesive on both the upper and soling substrates was activated with a heat lamp and the substrates were brought together and held in position for 15 seconds under a pressure of 70 psig. The bond had a 180° peel strength of 10 pli. when tested at a peeling rate of 2 inches per minute.

Adhesive-coated "Neolite" and uncoated upper material were bonded likewise. The bond showed a 180° peel strength of 8 pli. In contrast with conventional commercial practice, this high level of peel strength was obtained without the use of surface primers.

EXAMPLE 32

In the manner described in Example 4, a pressure sensitive adhesive was prepared by blending 25 parts of the segmented copolyester of Example 4, 50 parts of "Piccolastic" A 5 styrene homopolymer (Example 4), 25 parts of "LTP" 115 terpene resin (Example 9), and 0.5 part of "Irganox" 1010 antioxidant (Example 1). The sponge backing of a 4 inch × 4 inch sample of commercial carpet tile was coated with the molten adhesive at 177°C. by drawing down with a No. 12 wire wound bar.

The coated surface gave strong adhesion on contact with Mylar film. The 180° peel strength was 4.5 pli. versus less than about 1 pli. for a commercial carpet tile coated with a pressure sensitive adhesive. The resistance to creep rupture was measured by testing the time required for bond failure under 1 psi. shear stress. The adhesive of this invention withstood for 200 minutes versus 80 minutes for a commercial material. High temperature bond strength was determined by measuring the temperature at which the adhesive bond failed when the bonded specimen was heated at a moderate rate under 1 psi. shear stress. The above adhesive withstood beyond 150°C.

EXAMPLE 33

In the manner described in Example 4 a pressure sensitive adhesive composition was prepared by blending 25 parts of the segmented copolyester employed in Example 4, 40 parts of "Piccodiene" 2215, a polydicyclopentadiene resin having a ring and ball softening point of 102°C., manufactured by Pennsylvania Industrial Chemical Co., 35 parts of "Piccolastic" A 5 styrene homopolymer (Example 4), and 0.5 part of "Irganox" 1010 antioxidant (Example 1). In the manner of Example 32 this adhesive was applied to the back of a foam-backed carpet tile in the molten state using a wire-wound rod. Subsequent testing showed that this composition possessed a satisfactory level of tack and had a high temperature bond failure temperature of 135°C.

EXAMPLE 34

In a small cup heated to about 200°C. was placed 5 g. of the segmented copolyester of Example 4, and 5 g. of "Chlorowax" 70, a chlorinated paraffin wax containing 70 percent chlorine sold by Diamond Alkali Co. The molten resins were thoroughly mixed to give a transparent and tough thermoplastic material which was suitable for use as a hot melt adhesive. Prolonged heating of this blend during preparation and use was avoided because it tended to darken on long heating.

EXAMPLE 35

A 1.0 pound sample of the mixture prepared in Example 4 containing "Piccoumaron" 410 HL petroleum resin, "Piccolastic" A 5 styrene homopolymer, "Irganox" 1010 antioxidant, and the segmented copolyester was extrusion blended with an additional 3.45 pounds of the segmented copolyester described in Example 4. This blend was melt applied at 180°C., to a woven polyester braid such as is used as the reinforcement layer in the preparation of hydraulic hoses. Greater penetration of the braid with attendant greater adhesion to the braid was noted as compared with a sample of the same segmented copolyester alone.

EXAMPLE 36

A 9.5 g. portion of the segmented copolyester used in Example 5 was dissolved in 200 ml. of boiling chloroform along with 0.5 g. of "Piccolastic" A 50 styrene homopolymer (Example 1). After cooling, 220/3 ply Dacron polyester thread was passed through the solution resulting in a 3 weight percent pick-up of the copolyester composition. The three plies were observed to be bonded together and did not unravel. The thread possessed good stiffness, but yet was still flexible. The coating also lowered the amount of fuzz on the surface of the thread.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

We claim:

1. A method of applying a coating of a hot-melt adhesive to a substrate which comprises applying as the adhesive coating a composition which comprises, based on the total thermoplastic components, A. 1 to 99 percent by weight of thermoplastic segmented copolyester elastomer consisting essentially of a multiplicity of recurring short chain ester units and long chain ester units joined through ester linkages, said short chain ester units amounting to 15 to 75 percent by weight of said copolyester and being of the formula

and said long chain ester units amounting to 25 to 85 percent by weight of said copolyester and being of the formula

wherein R is the divalent aromatic radical remaining after removal of the carboxyl group from aromatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, said copolyester having a melt index of less than 150 and a melting point of at least 125°C., and B. 1 to 99 percent by weight of low molecular weight thermoplastic resin which forms compatible mixtures with the segmented copolyester, is thermally stable at 150°C., and has a melt viscosity of less than 10,000 centipoises at 200°C.

2. A method of applying a pressure sensitive adhesive to a substrate which comprises applying as the pressure sensitive adhesive a composition which comprises, based on the total thermoplastic components, A. 5 to 50 percent by weight of thermoplastic segmented copolyester elastomer consisting essentially of a multiplicity of recurring short chain ester units and long chain ester units joined through ester linkages, said short chain ester units amounting to 15 to 65 percent by weight of said copolyester and being of the formula

and said long chain ester units amounting to 35 to 85 percent by weight of said copolyester and being of the formula

wherein R is the divalent aromatic radical remaining after removal of the carboxyl groups from aromatic dicarboxylic acid having a molecular weight of less than 350, D is the divalent radical remaining after removal of the hydroxyl groups from organic diol having a molecular weight of less than 250, and G is the divalent radical remaining after removal of the terminal hydroxyl groups from long chain glycol having an average molecular weight of 350 to 6000, a melting point of less than 55°C., and a carbon to oxygen ratio of greater than 2.5, said polyester having a melt index of less than 150 and a melting point of at least 125°C., and B. 50 to 95 percent by weight of low molecular weight thermoplastic resin which forms compatible mixtures with the segmented copolyester, is thermally stable at 150°C., and has a melt viscosity of less than 10,000 centipoises at 200°c., and is selected from the group consisting of hydrocarbon resins, bituminous asphalts, coal tar pitches, rosins, phenolic resins, chlorinated aliphatic hydrocarbon waxes, and chlorinated polynuclear aromatic hydrocarbons.

* * * * *